US007719419B2

(12) United States Patent
Cruzado (10) Patent No.: US 7,719,419 B2
(45) Date of Patent: May 18, 2010

(54) INTRUSION DETECTION USING PSEUDO-RANDOM BINARY SEQUENCES (75) Inventor: Edwin D. Cruzado, Plant City, FL (US)

(73) Assignee: Honeywell International Inc., Morristown, NJ (US)

( * ) Notice: Subject to any disclaimer, the term of this patent is extended or adjusted under 35 U.S.C. 154(b) by 1201 days.

(21) Appl. No.: 11/265,632

(22) Filed: Nov. 2, 2005

(65) Prior Publication Data

US 2008/0117046 A1    May 22, 2008

(51) Int. Cl.
*G08B 21/00* (2006.01)
(52) U.S. Cl. .................. 340/540; 340/505; 340/506; 340/539.1; 340/539.11; 340/539.32; 340/572.1; 340/10.1; 340/825.36; 340/825.49; 340/5.2
(58) Field of Classification Search .......... 340/505, 340/506, 539.1, 539.11, 539.13, 539.32, 340/572.1, 10.1, 825.36, 825.49, 5.2, 687, 340/691.1
See application file for complete search history.

(56) References Cited

U.S. PATENT DOCUMENTS

| | | | |
|---|---|---|---|
| 4,161,348 A | 7/1979 | Ulrich | |
| 4,447,123 A | 5/1984 | Page et al. | |
| 4,523,186 A | 6/1985 | Fiarman | |
| 5,026,141 A | 6/1991 | Griffiths | |
| 5,117,457 A | 5/1992 | Comerford et al. | |
| 5,468,990 A | 11/1995 | Daum | |
| 5,506,566 A | 4/1996 | Oldfield et al. | |
| 5,568,124 A | 10/1996 | Joyce et al. | |
| 5,675,319 A | 10/1997 | Rivenberg et al. | |
| 5,677,769 A | 10/1997 | Bendett | |
| 5,821,582 A | 10/1998 | Daum | |
| 6,215,397 B1 | 4/2001 | Lindskog | |
| 6,396,400 B1 | 5/2002 | Epstein, III et al. | |
| 6,400,268 B1 | 6/2002 | Lindskog | |
| 6,490,317 B1 * | 12/2002 | Huscroft | 375/224 |
| 6,692,031 B2 | 2/2004 | McGrew | |
| 6,838,619 B1 | 1/2005 | Soyfertis | |
| 6,853,093 B2 | 2/2005 | Cohen et al. | |
| 6,970,360 B2 | 11/2005 | Sinha | |
| 7,005,733 B2 | 2/2006 | Kommerling et al. | |
| 7,015,823 B1 | 3/2006 | Gillen et al. | |

(Continued)

FOREIGN PATENT DOCUMENTS

DE    10065747    12/2000

(Continued)

*Primary Examiner*—Daryl Pope
(74) *Attorney, Agent, or Firm*—Shumaker & Sieffert, P.A.

(57) ABSTRACT

In one embodiment, a system comprises an enclosure, at least one item enclosed within the enclosure, and at least one optical medium disposed between the enclosure and the at least one item. The at least one optical medium is arranged in a pattern such that the at least one optical medium substantially encloses the at least one item. The system further comprises a generator communicatively coupled to a first portion of the optical medium. The generator generates a pseudo-random sequence of bits. The pseudo-random sequence of bits is optically transmitted over the optical medium. The system further comprises a detector communicatively coupled to a second portion of the optical medium. The detector detects any portion of the pseudo-random sequence of bits received at the second portion of the optical medium.

21 Claims, 4 Drawing Sheets

U.S. PATENT DOCUMENTS

| | | | |
|---|---|---|---|
| 7,021,146 | B2 | 4/2006 | Nash et al. |
| 7,030,974 | B2 | 4/2006 | Spirin et al. |
| 7,045,730 | B2 | 5/2006 | Hollar et al. |
| 2001/0033012 | A1 | 10/2001 | Kommerling et al. |
| 2001/0056542 | A1 | 12/2001 | Cesana et al. |
| 2002/0191261 | A1* | 12/2002 | Notargiacomo et al. ..... 359/181 |
| 2002/0191788 | A1 | 12/2002 | Inchalik et al. |
| 2002/0199111 | A1 | 12/2002 | Clark et al. |
| 2003/0011466 | A1* | 1/2003 | Samuel et al. ............. 340/5.73 |
| 2003/0014643 | A1 | 1/2003 | Asami et al. |

FOREIGN PATENT DOCUMENTS

| | | |
|---|---|---|
| EP | 0142013 | 5/1985 |
| EP | 0509567 | 10/1992 |
| EP | 0972632 | 1/2000 |
| EP | 1045352 | 10/2000 |
| EP | 1273997 | 1/2003 |
| WO | 9502742 | 1/1995 |
| WO | 9738364 | 10/1997 |
| WO | 0123980 | 4/2001 |

* cited by examiner

INTRUSION DETECTION USING PSEUDO-RANDOM BINARY SEQUENCES

CROSS REFERENCE TO RELATED APPLICATIONS

This application is related to U.S. patent application Ser. No. 11/170,881, titled "SYSTEM AND METHOD FOR DETECTING UNAUTHORIZED ACCESS TO ELECTRONIC EQUIPMENT OR COMPONENTS", filed on Jun. 30, 2005, which is incorporated herein by reference in its entirety and which is also referred to here as the "'881 Application."

BACKGROUND

Often, it is desirable to protect sensitive electronic equipment or components against unauthorized access. For example, electronic systems or components used for civilian applications can contain sensitive, proprietary information that needs to be protected against unauthorized access. For example, financial institutions and corporations use computerized systems to protect sensitive information (for example, personal data, customer data, financial data, financial transaction authorization codes, authentication procedures, security passwords, etc.). Such sensitive information may be stored in alterable semiconductor memory devices (e.g., flash memory device, EPROM, EEPROM, PROM, RAM, DRAM, etc.) or memory components of integrated circuits. A compromise in the security of the sensitive data contained in such memory devices or integrated circuits can result in significant tangible and intangible losses to the financial institutions and corporations, such as, for example, financial losses, losses due to fraudulent transactions, business losses, losses due to compromised customer lists and financial data, losses of institutional or corporate integrity, losses of commercial confidence, and losses due to adverse publicity.

One way in which an intruder might attempt to gain unauthorized access to sensitive information or structures in electronic equipment or components is by physically accessing the electronic equipment or components involved. For example, an intruder may attempt to gain physical access to sensitive electronic equipment by opening or removing a wall of the enclosure (for example, a chassis wall) for the electronic equipment, or gain physical access to sensitive data in an electronic component (for example, flash memory, integrated circuit, etc.) by creating a portal through or removing the encapsulant surrounding the component or assembly in order to expose the interconnect and/or address busses in the component. If such an attempted intrusion is successful, the intruder can observe and learn about the sensitive features in the electronic equipment, or reverse engineer the electronic components in order to access the sensitive data via the exposed interconnect and/or address busses in order to learn about and/or compromise the operations of the component or associated system.

SUMMARY

In one embodiment, a system comprises an enclosure, at least one item enclosed within the enclosure, and at least one optical medium disposed between the enclosure and the at least one item. The at least one optical medium is arranged in a pattern such that the at least one optical medium substantially encloses the at least one item. The system further comprises a generator communicatively coupled to a first portion of the optical medium. The generator generates a pseudo-random sequence of bits. The pseudo-random sequence of bits is optically transmitted over the optical medium. The system further comprises a detector communicatively coupled to a second portion of the optical medium. The detector detects any portion of the pseudo-random sequence of bits received at the second portion of the optical medium.

In another embodiment, a system comprises an electrical component, packaging substantially enclosing the electrical component, and at least one optical medium disposed between the packaging and the electrical component. The at least one optical medium is arranged in a pattern such that the at least one optical medium substantially encloses the at least electrical component. The system further comprises a generator communicatively coupled to a first portion of the optical medium. The generator generates a pseudo-random sequence of bits and optically transmits the pseudo-random sequence of bits over the optical medium. The system further comprises a detector communicatively coupled to a second portion of the optical medium. The detector detects any portion of the pseudo-random sequence of bits received at the second portion of the optical medium.

In another embodiment, a method comprises generating a pseudo-random sequence of bits and transmitting the pseudo-random sequence of bits over an optical medium from a first portion of the optical medium. The optical medium is substantially arranged in a pattern such that at least one item is substantially enclosed by the optical medium. The method further comprises detecting whether any portion of the pseudo-random sequence of bits received at a second portion of the optical medium.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
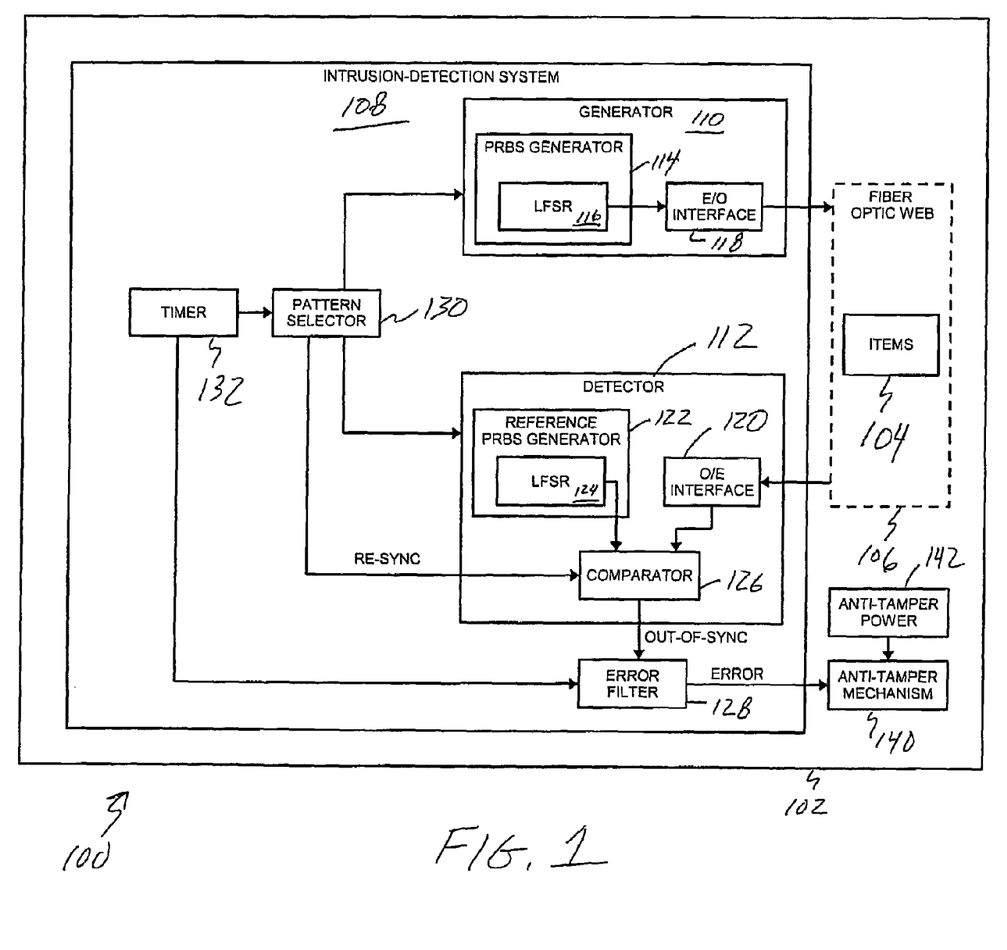
FIG. 1 is a high-level block diagram of one embodiment of a system that uses pseudo-random binary sequences for intrusion detection.

FIG. 1 is a high-level block diagram of one embodiment of a system 100. Embodiments of the system 100 are suitable for use in variety of applications (for example, military and commercial applications). The system 100 comprises an enclosure 102 in which one or more items 104 are enclosed. For example, in one implementation of such an embodiment, the items 104 that are enclosed within the enclosure 102 comprise one or more items of storage media in or on which sensitive data are stored and/or electronic equipment or components. The optical medium 106 is arranged in a pattern such that the optical medium 106 substantially encloses at least one of the items under protection 104. In the particular embodiment shown in FIG. 1, the optical medium comprises a fiber optic web (which is also referred to here in connection with FIG. 1 as "fiber optic web" 106). For example, in one implementation of such an embodiment, the enclosure 102 comprises a six-walled box. A separate fiber optic web 106 is embedded in or on each wall of such an enclosure 102. For the purposes of illustration, one fiber optic web 106 is shown in FIG. 1, though it is to be understood that multiple fiber optic webs 106 are used in other embodiments. Moreover, other types and configurations of optical media are used in other embodiments. Examples of optical media and fiber optic webs are described in the "'881 Application".

The system 100 also comprises an intrusion-detection system 108. In the embodiment shown in FIG. 1, the intrusion-detection system 108 is communicatively coupled to first and second portions of the fiber optic web 106 (also referred to here as the "input" and "output" of the fiber optic web 106, respectively). The intrusion-detection system 108 comprises a generator 110 that is communicatively coupled to the input of the fiber optic web 106. The generator 110 outputs an optical signal (for example, in the infrared, ultraviolet, or visible spectra range) onto the fiber optic web 106 via the input. The intrusion-detection system 108 further comprises a detector 112 that detects any optical signal that is able to be received at the output of the fiber optic web 106.

Figure 2A:
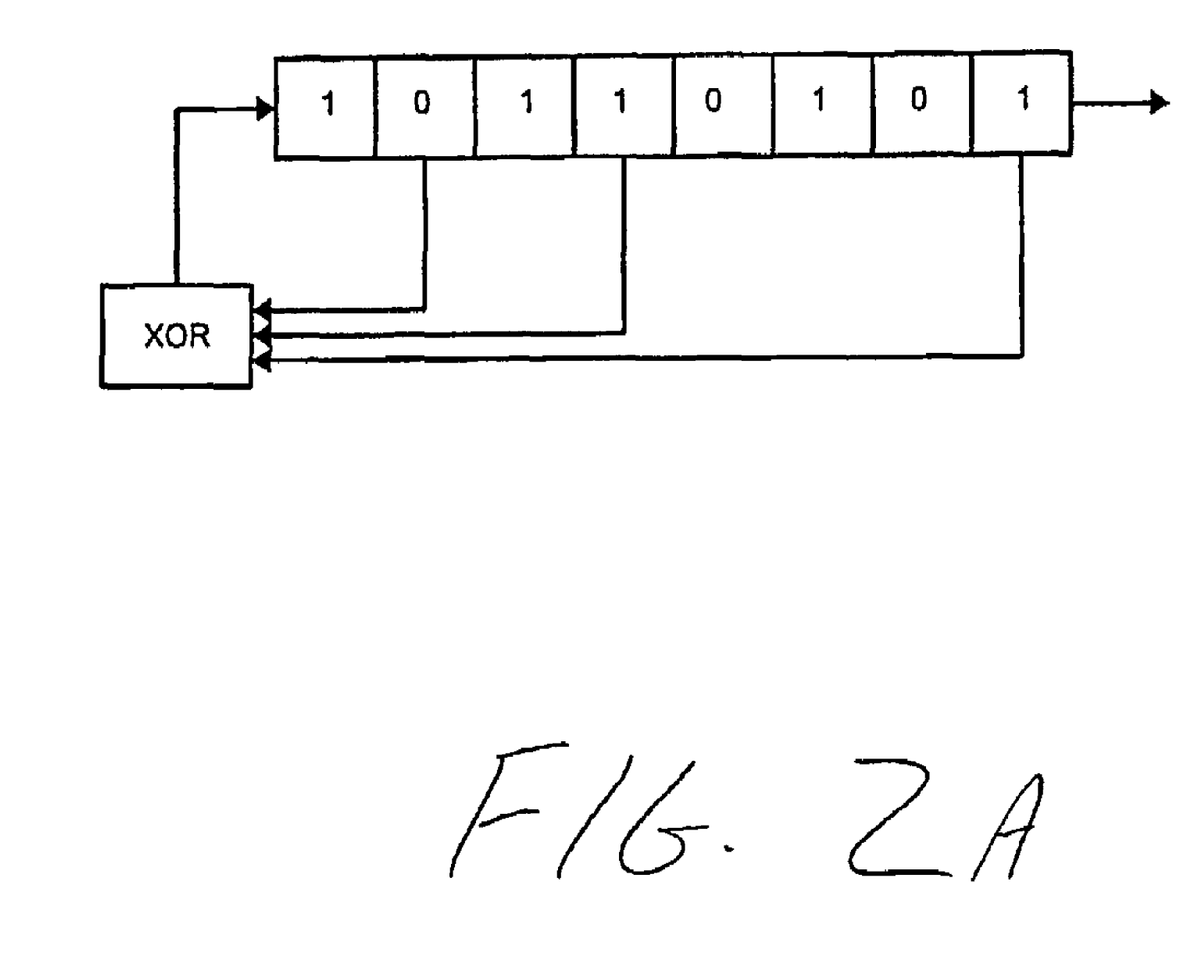
FIG. 2A is a high-level block diagram of one embodiment of a linear feedback shift register.

In the particular embodiment shown in FIG. 1, the generator 110 comprises a pseudo-random bit sequence (PRBS) generator 114 that outputs a digital, electrical signal that comprises a pseudo-random sequence of bits (also referred to here as a "bit stream"). In the embodiment shown in FIG. 1, the PRBS generator 114 is implemented using a linear-shift feedback register 116. One embodiment of a linear shift register 116 is shown in FIG. 2A. As shown in FIG. 2A, linear feedback shift register 116 comprises a series of n cells (referred to here as "cell 1", "cell 2", through "cell N"), where one bit is stored in each of the N cells. The initial value stored in the linear feedback shift register 116 is referred to here as the "seed value" for the register 116. Periodically (for example, when the linear feedback shift register 116 is clocked), the bits contained in the cells are shifted in a pre-determined direction. That is, the bit previously stored in cell 1 is stored in cell 2, the bit previously stored in cell 2 is stored in cell 3, and so on. The bit previously stored in cell N is taken as the output of the linear feedback shift register 116. The bit that is stored in cell 1 is determined by evaluating a polynomial that comprises an exclusive OR (XOR) operation performed on the bits previously stored in one or more of the other cells. The one or more cells that are used in the XOR operation to generate the new bit that is stored in cell 1 are also referred to here as the "tapped" cells or the "taps." One commonly known polynomial used in such an approach is the CRC-16 polynomial. Other polynomials can be used.

Figure 2B:
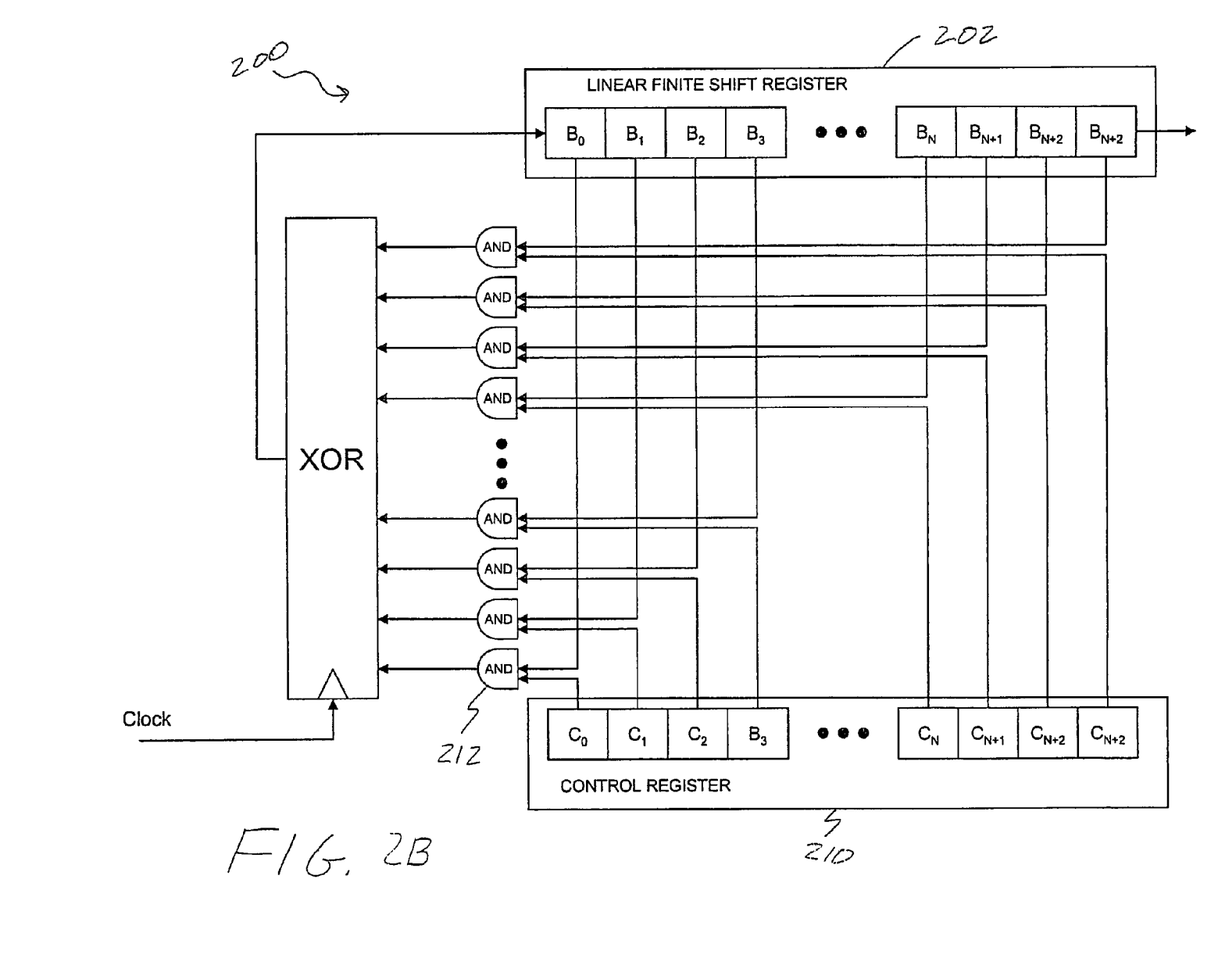
FIG. 2B is a high-level block diagram of one embodiment of a reconfigurable linear feedback shift register.

In one implementation, the polynomial that is used in each of linear feedback shift register is reconfigurable. FIG. 2B is a high-level block diagram of such an implementation of a linear feedback shift register 200. In this implementation, the cells of the linear feedback shift register 200 are stored in a linear finite shift register 202 (each bit or cell of which is labeled $B_0, B_1, B_2$ through $B_N, B_{N+1}$, and $B_{N+2}$ in the example of FIG. 2B). A control register 210 is used to modify the polynomial by "turning on" or "turning off" taps. Each bit of the control register 210 (labeled $C_0, C_1, C_2$ through $C_N, C_{N+1}$, and $C_{N+2}$ in the example of FIG. 2B) controls a respective one of the cells of the linear finite shift register 202. Each cell of the linear finite shift register 202 is logically AND'ed (using a respective AND gate 212) with a corresponding bit of the control register 210, and the result of such AND operation is input to a XOR gate 214 of the linear feedback shift register 200. In this example, if a bit of the control register 210 is set to a logical value of "0", the corresponding cell of the linear finite shift register 202 is not tapped; if a bit of the control register 210 is set to a logical value of "1", the corresponding cell of the linear finite shift register 202 is tapped. Each tap is a variable in the polynomial expression. It is to be understood that the control register 210 can be the same size as the linear finite shift register 202 or can be some smaller size. If a control register 210 is smaller, such a control register 210 will not control all bits of the linear finite shift register 202 and thus will not be able implement all possible polynomial combinations.

The generator 110 (shown in FIG. 1) further comprises an electrical-to-optical (E/O) interface 118 (for example, a laser or light emitting diode (LED)) that receives the electrical bit stream output by the bit-pattern generator 114 and generates an optical signal on which the received bit stream is modulated or encoded. The E/O interface 118 applies the optical signal to the input of the fiber optic web 106. For example, in one implementation of such an embodiment, the E/O interface 118 outputs an optical burst or pulse having a predetermined amplitude and duration for each bit in the bit stream that has a first logic value (for example, a logical "1" value) and does not output a burst for the predetermined duration for each bit in the bit stream that has a second logic value (for example, a logical "0" value). In other embodiments, the bit stream is modulated or encoded on the optical signal output by the E/O interface 118 in other ways.

The detector 112 comprises an optical-to-electrical (O/E) interface 120 (for example, a photo diode) that detects any optical signal received at the output of the fiber optic web 106 and outputs an electrical signal that comprises the bit stream, if any, that has been modulated or encoded onto the received optical signal. In the embodiment shown in FIG. 1, the detector 112 also comprises a reference pseudo-random bit sequence (PRBS) generator 122 that outputs a digital, electrical signal that comprises a pseudo-random sequence of bits (also referred to here as a "reference bit stream"). The reference bit stream output by the reference PRBS generator 122 of the detector 112 is the same as the bit stream output by the PRBS generator 114 of the generator 110. In the embodiment shown in FIG. 1, the reference PRBS generator 122 is implemented using a linear-shift feedback register 124 that is configured using the same polynomial, seed value, and taps as the linear shift feedback register 116 of the detector 110. For example, in one implementation of such an embodiment, the linear-shift feedback register 124 is implemented using a reconfigurable linear shift feedback register of the type shown in FIG. 2B (where reconfiguration occurs using the control register 210 described above in connection with FIG. 2B).

The detector 112 further comprises a comparator 126 that compares each bit of the bit stream output by the O/E interface 120 with a respective bit of the reference bit stream output by the reference PRBS generator 122. The output of the comparator 126 indicates whether the current comparison was a match or not. The output of the comparator 126 is also referred to here as an "out-of-sync indicator" that is indicative of whether the bit stream output by the O/E interface 120 is synchronized with the reference bit stream output by the reference PRBS generator 122.

The intrusion-detection system 108 further comprises an error filter 128 that receives the output of the comparator 126 and determines when an "error" has occurred. That is, the error filter 128 determines when a disruption of the bit stream communicated over the fiber optic web 106 is considered to have occurred. A disruption is considered to have occurred (and the error signal output by the error filter 128 is asserted) when a predetermined error condition exists. The predetermined error condition is a function of the out-of-sync indicator. In one implementation of such an embodiment, the predetermined error condition exists when a given number of bit mismatches occur within a predetermined amount of time or a predetermined number of bits have been received at the O/E interface 120 (also referred to here as an "error window"). In such an implementation, the error filter 128 counts the number of mismatches that occur between the most recent bit output by the linear shift register 122 and the most recent bit output by the O/E interface 120 and when the count exceeds a predetermined threshold within a given error window, the error filter 128 asserts the error signal. In other implementations and embodiments, other error conditions are used. In the embodiment shown in FIG. 1, an intrusion attempt is considered to have occurred when the error condition is true.

The intrusion-detection system 108 further comprises a pattern selector 130. The pattern selector 130 is communicatively coupled to the PRBS generator 114 of the generator 110 and the reference PRBS generator 122 of the detector 112. The pattern selector 130 communicates information to the PRBS generator 114 and the reference PRBS generator 122 that specifies the particular bit stream to be output by the generators 114 and 122 (also referred to here as "PRBS configuration information"). In the particular embodiment shown in FIG. 1, the information communicated by the pattern selector 130 to the PRBS generator 114 and the reference PRBS generator 122 comprises information that is used to configure the linear shift feedback register 116 and the linear feedback shift register 124, respectively. For example, in one implementation of such an embodiment, the PRBS configuration information comprises a seed value, polynomial, and taps to be used by the linear feedback shift registers 116 and 124. In another implementation, the PRBS configuration information comprises a selection of one of a set of predetermined linear feedback shift register configurations maintained at the PRBS generators 114 and 122.

In the embodiment shown in FIG. 1, when the PRBS generator 114 and the reference PRBS generator 122 are reconfigured, the E/O interface 118 stops transmitting on the fiber optic web 106. As a result, the O/E interface 120 loses synchronization with the E/O interface 118. In such an embodiment, the E/O interface 118, after the PRBS generator 116 has been reconfigured, outputs a predetermined synchronization pattern for a predetermined period of time in order for the O/E interface 120 to synchronize its processing to the E/O interface 118. After the synchronization pattern has been transmitted, the PRBS generator 116 starts outputting the new PRBS bit stream for transmission by the E/O interface 118 on the fiber optic web 106.

While such re-synchronization is occurring, the pattern selector 130 asserts a re-synch signal. If the re-sync signal is asserted, the comparator 124 does not perform the comparison of the most recent bit output by the linear shift register 122 with the most recent bit output by the O/E interface 120. When sufficient time has elapsed for such reconfiguration and re-synchronization to be completed, the pattern selector 128 de-asserts the re-sync signal and the comparator 124 performs the comparison of the most recent bit output by the linear shift register 122 with the most recent bit output by the O/E interface 120. In this way, the comparator 126 does not erroneously assert the out-of-sync signal while such a re-configuration is occurring.

The intrusion-detection system 108 also comprises a timer 132 that indicates to the pattern selector 130 and the error filter 126 when a reconfiguration of the PRBS generators 114 and 122 should occur. For example, in one implementation of the embodiment shown in FIG. 1, the PRBS generators 114 and 122 are re-configured periodically.

In the particular embodiment shown in FIG. 1, the system 100 further comprises an anti-tamper response mechanism 140 that performs (or causes to be performed) one or more anti-tamper related actions in response to one or more intrusion attempts (or when some other intrusion-related condition is true). Examples of such actions include signaling an alarm (either silent or audible), transmitting a homing beacon, and/or disabling or destroying one or more components of the system 100. For example, in the embodiment shown in FIG. 1, the items 104 comprises critical functionality and/or data that are disabled, destroyed and/or deleted by an anti-tamper related action performed (or caused to be performed) by the anti-tamper response mechanism 140. In the particular embodiment shown in FIG. 1, the system 100 also includes an anti-tamper power supply 142 for providing power to carry out such anti-tamper related actions in the event there is no main system power for the system 100. Examples of such anti-tamper functionality are described in the '881 Application.

In operation, when the intrusion-detection system 108 is "armed" (that is, is operated so as to detect intrusions) and the timer 132 indicates to the pattern selector 130 and the error filter 126 that a reconfiguration of the PRBS generators 114 and 122 should occur, the pattern selector 130 provides PRBS configuration information to the PRBS generators 114 and 122 and asserts the re-sync signal. When the comparator 126 detects that the re-sync signal has been asserted, the comparator 126 ceases performing the comparison of the output of the O/E interface 120 and the output of the reference PRBS generator 122. When the PRBS generators 114 and 122 receives the PRBS configuration information, the PRBS generators 114 and 122 reconfigure their linear shift feedback registers 116 and 124, respectively. After the PRBS generators 114 and 122 have been reconfigured, the E/O interface 118 outputs the synchronization pattern for the predetermined synchronization period in order for the O/E interface 120 to synchronize to the transmissions of the E/O interface 118. After the synchronization pattern has been transmitted and the synchronization period has elapsed, the PRBS generator 114 starts outputting the new PRBS bit stream to the E/O interface 118 for transmission on the fiber optic web 106.

The O/E interface 120 detects any optical signal that it is able to receive at the output of the fiber optic web 106 and outputs an electrical signal that comprises the bit stream, if any, that has been modulated or encoded onto the received optical signal. The comparator 126 compares the most recent bit output by the linear shift register 124 of the reference PRBS generator 122 with the most recent bit output by the O/E interface 120. If the fiber optic web 106 is intact, O/E interface 120 should receive the optical pulse stream output by the E/O interface 118 and, as a result, the most recent bit output by the linear shift register 124 should match the most recent bit output by the O/E interface 120. If the fiber optic web 106 is disrupted such that the O/E interface 120 is not able to properly receive the optical pulse stream output by the E/O interface 118, eventually the most recent bit output by the linear shift register 122 will not match the most recent bit output by the O/E interface 120 and the comparator 126 will assert the out-of-sync signal. The error filter 128 will count the number of times that a mismatch has occurred in a given error window and if the number of mismatches exceeds the predetermined threshold within a given error window, the error filter 128 asserts the error signal. In the embodiment shown in FIG. 1, the anti-tamper response mechanism 140 then, if appropriate, takes one or more anti-tamper related actions in response thereto.

The embodiment shown in FIG. 1 is exemplary and it is to be understood that the methods and techniques described here can be implemented in other ways. One alternative embodiment is shown in FIG. 3.

Figure 3:
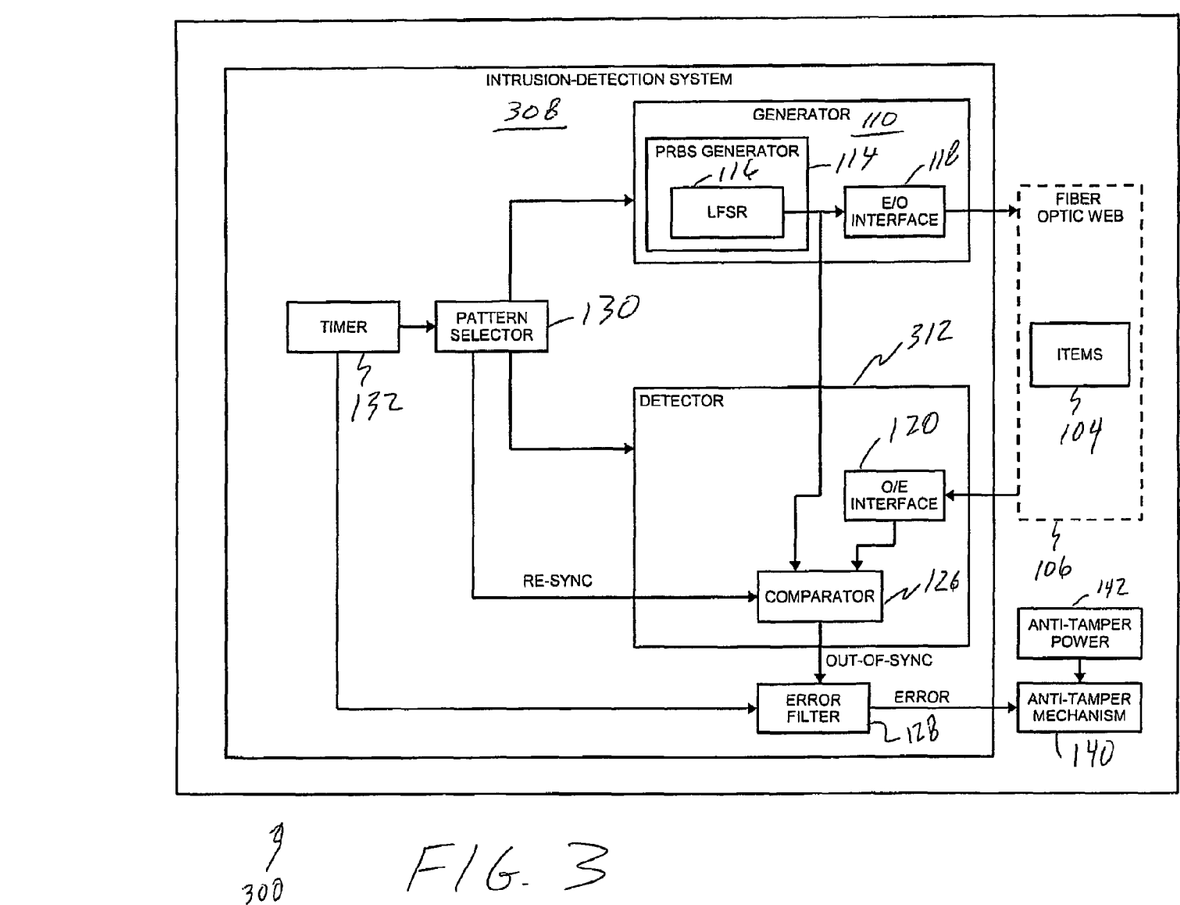
FIG. 3 is a high-level block diagram of an alternative embodiment of a system 300 that uses pseudo-random binary sequences for intrusion detection.

FIG. 3 is a high-level block diagram of one embodiment of a system 300. The system 300 shown in FIG. 3 is similar to the system 100 shown in FIG. 1 except that the intrusion-detection system 308 of system 300 does not include a separate reference PRBS generator 122 (and linear shift feedback register 124) to generate the reference bit stream. Instead, the bit stream output by the PRBS generator 114 is communicated to the detector 312, where the bit stream is used by the comparator 126. Otherwise, the system 300 is similar to the system 100 of FIG. 1 and similar components are referenced in FIG. 3 using the same reference numerals used in FIG. 1 for those components.

Moreover, although the intrusion-detection systems of FIGS. 1 and 3 are described here as being used to detect intrusions of an enclosure 102, it is to be understood that, in other embodiments, such intrusion-detection systems are used to detect intrusions in other structures or devices. For example, in one such embodiment, an item of optical media is embedded in or on packaging that surrounds (or otherwise encapsulates) an electronic device such as a circuit board or a component. Examples of such optical media (and appropriate E/O and O/E interfaces) are described in the '881 Application. In one such embodiment, the intrusion-detection system itself is not physically located within the packaging surrounding the device under protection.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system comprising:
an enclosure;
at least one item enclosed within the enclosure;
at least one optical medium disposed between the enclosure and the at least one item, wherein the at least one optical medium is arranged in a pattern such that the at least one optical medium substantially encloses the at least one item;
a generator communicatively coupled to a first portion of the optical medium, wherein the generator generates a pseudo-random sequence of bits, wherein the pseudo-random sequence of bits is optically transmitted over the optical medium; and
a detector communicatively coupled to a second portion of the optical medium, wherein the detector detects a portion of the pseudo-random sequence of bits received at the second portion of the optical medium.

2. The system of claim 1, wherein the portion of the pseudo-random sequence of bits received at the second portion of the optical medium is compared to at least a portion of the generated pseudo-random sequence of bits to determine if the physical integrity of the optical medium has been compromised.

3. The system of claim 2, further comprising an anti-tamper mechanism and an error filter, wherein the error filter determines when the anti-tamper mechanism should cause an anti-tamper related action to be performed by counting a number of bit mismatches between the bits received at the second portion of the optical medium and the generated pseudo-random sequence of bits occurring within a predetermined error window, comparing the count to a predetermined threshold count, and determining that an anti-tamper related action should be performed when the count exceeds the threshold count.

4. The system of claim 2, further comprising a comparator to compare the at least a portion of the pseudo-random sequence of bits optically transmitted over the optical medium to the portion of the pseudo-random sequence of bits received at the second portion of the optical medium.

5. The system of claim 2, wherein a reference pseudo-random sequence of bits is generated, wherein the reference pseudo-random sequence of bits comprises the pseudo-random sequence of bits optically transmitted over the optical medium, wherein at least a portion of the reference pseudo-random sequence of bits is compared to the portion of the pseudo-random sequence of bits received at the second portion of the optical medium to determine if the integrity of the optical medium has been compromised.

6. The system of claim 3, wherein the at least one item comprises at least one of an electronic equipment and an electronic component, and the anti-tamper related action is the destruction or disabling of the at least one of an electronic equipment and an electronic component.

7. The system of claim 1, wherein the at least one item comprises at least one of electronic equipment and an electronic component, and wherein said optical medium is integrally formed in or on a packaging material encapsulating the at least one item.

8. The system of claim 1, wherein the generator is configured to periodically generate a different pseudo-random sequence of bits.

9. A system comprising:
an electrical component;
packaging substantially encapsulating the electrical component;

at least one optical medium integrally formed in or on the packaging, wherein the at least one optical medium is arranged in a pattern such that the at least one optical medium substantially encloses the electrical component;

a generator communicatively coupled to a first portion of the optical medium, wherein the generator generates a pseudo-random sequence of bits and optically transmits the pseudo-random sequence of bits over the optical medium; and a detector communicatively coupled to a second portion of the optical medium, wherein the detector detects a portion of the pseudo-random sequence of bits received at the second portion of the optical medium.

10. The system of claim 9, wherein the portion of the pseudo-random sequence of bits received at the second portion of the optical medium is compared to at least a portion of the pseudo-random sequence of bits optically transmitted over the optical medium to determine if the physical integrity of the optical medium has been compromised.

11. The system of claim 10, further comprising an anti-tamper mechanism and an error filter, wherein the error filter determines when the anti-tamper mechanism should cause an anti-tamper related action to be performed by counting a number of bit mismatches between the bits received at the second portion of the optical medium and the generated pseudo-random sequence of bits occurring within a predetermined error window, comparing the count to a predetermined threshold count, and determining that an anti-tamper related action should be performed when the count exceeds the threshold count.

12. The system of claim 11, wherein the anti-tamper related action is the destruction or disabling of the electrical component.

13. The system of claim 9, wherein the generator is configured to periodically generate a different pseudo-random sequence of bits.

14. The system of claim 9, wherein the generator and detector are disposed outside of said optical medium.

15. A method for detecting intrusion comprising:
generating a pseudo-random sequence of bits;
transmitting the pseudo-random sequence of bits over an optical medium from a first portion of the optical medium, wherein the optical medium is substantially arranged in a pattern such that at least one item is substantially enclosed by the optical medium; and
detecting whether a portion of the pseudo-random sequence of bits is received at a second portion of the optical medium.

16. The method of claim 15, further comprising:
generating a reference pseudo-random sequence of bits, wherein the reference pseudo-random sequence of bits comprises the pseudo-random sequence of bits optically transmitted over the optical medium; and
comparing at least a portion of the reference pseudo-random sequence of bits to the portion of the pseudo-random sequence of bits received at the second portion of the optical medium in order to determine if the integrity of the optical medium has been compromised.

17. The method of claim 15, wherein generating the pseudo-random sequence of bits comprises generating the pseudo-random sequence of bits using a linear feedback shift register, and wherein the method further comprises:
periodically re-configuring the linear feedback shift register to generate a new pseudo-random sequence of bits different from a prior pseudo-random sequence of bits; and
communicating a synchronization pattern over the optical medium while the configuring occurs.

18. The method of claim 15, wherein the at least one item comprises at least one of electronic equipment and an electronic component, and wherein said optical medium is integrally formed in or on a packaging material encapsulating the at least one item.

19. The method of claim 15, further comprising:
comparing the portion of the pseudo-random sequence of bits received at the second portion of the optical medium to at least a portion of the pseudo-random sequence of bits optically transmitted over the optical medium in order to determine if the physical integrity of the optical medium has been compromised, and
filtering results from the comparing in order to determine when to perform an anti-tamper related action by counting a number of bit mismatches between the bits received at the second portion of the optical medium and the generated pseudo-random sequence of bits occurring within a predetermined error window, comparing the count to a predetermined threshold count, and determining that an anti-tamper related action should be performed when the count exceeds the threshold count.

20. The method of claim 19, wherein the anti-tamper related action is the destruction or disabling of an electrical component encapsulated in a packaging material and surrounded by said optical medium.

21. An apparatus comprising:
means for generating a pseudo-random sequence of bits;
means for transmitting the pseudo-random sequence of bits over an optical medium from a first portion of the optical medium, wherein the optical medium is substantially arranged in a pattern such that at least one item is substantially enclosed by the optical medium; and
means for detecting whether a portion of the pseudo-random sequence of bits is received at a second portion of the optical medium.

* * * * *